US011039244B2

United States Patent
Port et al.

(10) Patent No.: US 11,039,244 B2
(45) Date of Patent: Jun. 15, 2021

(54) MANUAL CHARACTERIZATION OF PERCEIVED TRANSDUCER DISTORTION

(71) Applicant: DOLBY LABORATORIES LICENSING CORPORATION, San Francisco, CA (US)

(72) Inventors: Timothy Alan Port, Drummoyne (AU); Sebastian P. B. Holzapfel, Mountain View, CA (US); Juan Felix Torres, Darlinghurst (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/433,636

(22) Filed: Jun. 6, 2019

(65) Prior Publication Data

US 2019/0379973 A1 Dec. 12, 2019

Related U.S. Application Data

(60) Provisional application No. 62/681,543, filed on Jun. 6, 2018.

(51) Int. Cl.
*H04R 3/04* (2006.01)
*G06F 3/16* (2006.01)
(Continued)

(52) U.S. Cl.
CPC ............ *H04R 3/04* (2013.01); *G06F 3/165* (2013.01); *G10L 21/0232* (2013.01);
(Continued)

(58) Field of Classification Search
CPC ..... G10L 21/0232; H04B 17/12; H04B 10/07; H04B 17/0085; H04B 17/23; H04B 17/29;
(Continued)

(56) References Cited

U.S. PATENT DOCUMENTS 7,031,474 B1 *  4/2006  Yuen ................. H04S 1/005
                                                                381/1
7,550,977 B2 *  6/2009  Quan ................. G01R 23/20
                                                                324/622

(Continued)

FOREIGN PATENT DOCUMENTS

WO    2008016531    2/2008
WO    2011/139502   11/2011
(Continued)

OTHER PUBLICATIONS

Borwick, John, "Chapter 12: Loudspeaker Measurements" Loudspeaker and Headphone Handbook, Mar. 12, 2001, Focal Press, Oxford, vol. 26, pp. 529-564.

(Continued)

*Primary Examiner* — Lun-See Lao

(57) ABSTRACT

Systems and methods for manual characterization of perceived transducer distortion are described. The system includes a signal generator, a controller, a multi-band compressor, and an audio transducer. The signal generator is configured to generate a test signal for a frequency band. The test signal includes at least two simultaneous frequency-modulated tones, which may be combined together in an amplitude-modulated envelope. The at least two simultaneous frequency-modulated tones have different frequencies within the frequency band. The controller is configured to receive user input indicating a gain value. The multi-band compressor is coupled to the signal generator. The multi-band compressor is configured to adjust an amplitude of a component of the test signal based on the gain value. The audio transducer is coupled to the multi-band compressor. The audio transducer is configured to generate an audio signal based on the test signal.

20 Claims, 5 Drawing Sheets

(51) Int. Cl.
*H04R 29/00* (2006.01)
*H04B 17/12* (2015.01)
*G10L 21/0232* (2013.01)

(52) U.S. Cl.
CPC ........... *H04B 17/12* (2015.01); *H04R 29/001* (2013.01); *H04R 2430/01* (2013.01)

(58) Field of Classification Search
CPC ........... H04B 3/46; H04B 3/462; H04M 3/08; H04M 11/04; H04M 11/045; H04M 3/30; H04R 2430/01; H04R 29/001; H04R 3/04; H04R 2225/43; H04R 25/505; H04R 5/04; G10K 11/175; G10K 11/1785; G10K 2210/116; G10K 2210/3026; G10K 2210/3027; G10K 2210/3046; G10K 2210/3222; H04H 20/88; H04J 9/00; H04L 1/08; H04L 25/4904; H04L 5/06; H04L 5/18; H04L 1/0002; H04Q 11/02; H04Q 1/45; H04Q 1/453; H04Q 3/0016; H04W 24/00; H04W 24/04; H04W 84/02; H04W 88/022; H04W 8/245
USPC .............................. 381/94.1–94.5, 56–59, 96
See application file for complete search history.

(56) References Cited

U.S. PATENT DOCUMENTS

| | | | | |
|---|---|---|---|---|
| 8,965,774 | B2* | 2/2015 | Eppolito | H03G 7/007 381/106 |
| 9,130,527 | B2* | 9/2015 | Potard | H03G 9/18 |
| 10,153,744 | B1* | 12/2018 | Every | H03G 3/20 |
| 2007/0069739 | A1 | 3/2007 | Quan | |
| 2013/0142360 | A1 | 6/2013 | Potard | |
| 2014/0140522 | A1* | 5/2014 | Deng | H04R 3/08 381/59 |
| 2014/0181271 | A1* | 6/2014 | Millington | H04L 65/4084 709/219 |
| 2015/0270819 | A1 | 9/2015 | Seefeldt | |
| 2016/0072467 | A1 | 3/2016 | Seefeldt | |
| 2017/0280241 | A1 | 9/2017 | Iyer | |

FOREIGN PATENT DOCUMENTS

| | | |
|---|---|---|
| WO | 2013009548 | 1/2013 |
| WO | 2015124598 | 8/2015 |
| WO | 2016155853 | 10/2016 |

OTHER PUBLICATIONS

Lin, L. et al "Auditory Filter Bank Design Using Masking Curves" Proc. of Eurospeech, Sep. 3-7, 2001, pp. 411-414.

Metzler, Bob "Audio Measurement Handbook" Aug. 16, 1993, pp. 40.

* cited by examiner

MANUAL CHARACTERIZATION OF PERCEIVED TRANSDUCER DISTORTION

CROSS-REFERENCE TO RELATED APPLICATIONS

This patent application claims the benefit of priority U.S. Provisional Patent Application No. 62/681,543, filed on Jun. 6, 2018, incorporated by reference in its entirety.

FIELD

This application relates generally to audio presentation and, in particular, to distortion reduction during audio presentation.

BACKGROUND

Playback devices, such as headphones, freestanding speakers, laptop computers, mobile communication devices, portable music players, and televisions; include amplifiers and audio transducers (for example, loudspeakers) with limited output capabilities. In such devices, audio playback can be perceptibly distorted as playback level is increased during presentation. Further, this distortion is oftentimes frequency dependent for a playback device. For example, a television's casing may exhibit a resonance response at a specific frequency when an output signal generally exceeds a particular level, resulting in an annoying rattle. Transducer distortion can be reduced by a multi-band compressor. The multi-band compressor attenuates particular frequency bands by applying gain values according to corresponding distortion thresholds. Identifying the gain values and distortion thresholds involves a tuning process.

SUMMARY OF THE DESCRIPTION

Various aspects of the present disclosure relate to circuits, systems, and methods for manually characterizing perceived distortion of an audio transducer.

The present disclosure provides a system that includes, in one implementation, a signal generator, a controller, a multi-band compressor, and an audio transducer. The signal generator is configured to generate a test signal for a frequency band. The test signal includes at least two simultaneous frequency-modulated tones. The at least two simultaneous frequency-modulated tones have different frequencies within the frequency band. The controller is configured to receive user input indicating a gain value. The multi-band compressor is coupled to the signal generator. The multi-band compressor is configured to adjust an amplitude of a component of the test signal based on the gain value. The audio transducer is coupled to the multi-band compressor. The audio transducer is configured to generate an audio signal based on the test signal.

The present disclosure also provides a method that includes generating a test signal for a frequency band. The test signal includes at least two simultaneous frequency-modulated tones. The at least two simultaneous frequency-modulated tones have different frequencies within the frequency band. The method also includes receiving user input indicating a gain value. The method further includes adjusting an amplitude of a component of the test signal based on the gain value. The method also includes generating an audio signal with an audio transducer based on the test signal.

The present disclosure also provides a non-transitory computer-readable medium storing instructions that, when executed by a processor of a computer, cause the computer to perform operations including generating a test signal for a frequency band. The test signal includes at least two simultaneous frequency-modulated tones. The at least two simultaneous frequency-modulated tones have different frequencies within the frequency band. The operations also include receiving a user input indicating a gain value. The operations further include adjusting an amplitude of a component of the test signal based on the gain value. The operations also include generating an audio signal with an audio transducer based on the test signal.

In this manner, various aspects of the present disclosure provide for the reduction of transducer distortion, and effect improvements in at least the technical fields of audio processing and presentation.

BRIEF DESCRIPTION OF DRAWINGS

The present disclosure is illustrated by way of example, and not by way of limitation, in the figures of the accompanying drawings and in which reference numerals refer to similar element and in which.

DETAILED DESCRIPTION

The inner ear of humans includes a sense organ for hearing called the cochlea, which creates an auditory filter that separates the frequency components of audio signals into a plurality of frequency bands called critical bands. In general, a critical band is a band of audio frequencies within which a second tone will interfere with the perception of the first tone by audio masking. The Bark scale is an example of a psycho-acoustical scale that ranges from 1 to 24 and corresponds to the first 24 critical bands of human hearing;

however, other psycho-acoustical scales may be used which extend beyond the 24th Bark band. In one example, an extended Bark scale may be defined which includes a 25th Bark band extending above 19 kHz.

Figure 1:
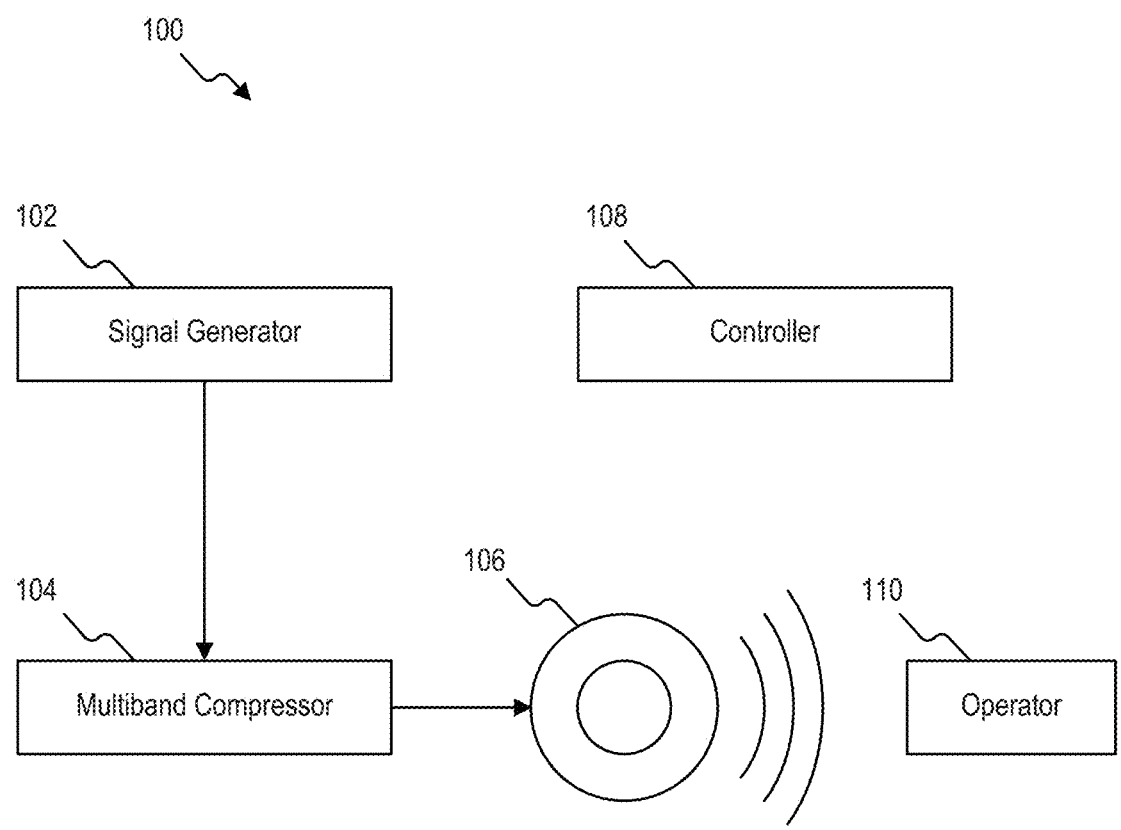
FIG. 1 illustrates a block diagram of an exemplary system for manual characterization of perceived transducer distortion, according to an implementation of the present disclosure.

For manual tuning of an audio system, a distortion threshold for a frequency band (for example, a critical frequency band of the Bark scale) can be identified by playing a frequency-modulated pure tone within the frequency band, and manually increasing the amplitude of the pure tone until distortion is audible. However, with pure tone excitation, it may be difficult for a listener to subjectively determine what an acceptable level of distortion is. This difficulty results in lengthy tuning times and reduced tuning precision when using pure tone excitation. Further, it is not possible to hear intermodulation distortion with pure tone excitation, which is problematic in music and further reduces tuning precision. FIG. 1 illustrates a block diagram of an example system for manual characterization of perceived transducer distortion according to an implementation of the present disclosure. Specifically, FIG. 1 illustrates a system 100 which includes a signal generator 102, a multi-band compressor 104, an audio transducer 106, a controller 108, and an operator 110. In practice, the system 100 may include additional components such as additional audio transducers, additional signal processors (for example, amplifiers), a power supply, a memory, and the like. For ease of explanation, these additional components are not illustrated here.

The signal generator 102 is configured to generate test signals for the audio transducer 106. As will described below in more detail, the multi-band compressor 104 adjusts the test signals by splitting them into different frequency bands, and then individually adjusting the components of each frequency band in order to reduce or eliminate perceived distortion. In some implementations, the different bands of the multi-band compressor 104 are divided among the range of human hearing. For example, each frequency band of the multi-band compressor 104 may represent one of the critical bands of the Bark scale described above. As will be described below in more detail, each test signal is designed to test a specific frequency band of the different frequency bands of the multi-band compressor 104. For example, the signal generator 102 may generate a test signal to test one of the critical bands of the Bark scale described above. In some aspects of the present disclosure, a frequency band may correspond to the entire spectrum.

The signal generator 102 is configured to include two or more simultaneous frequency-modulated tones in each test signal. The frequency of each frequency-modulated tone included in a test signal is different. The frequency of each frequency-modulated tone is considered different if the base frequency (that is, the "center" frequency around which the frequency modulation is based) is different, the frequency modulation is different, or both. As described above, each test signal is designed to test a specific frequency band of the multi-band compressor 104. Thus, the frequency of each frequency-modulated tone included in a test signal is within the frequency band being tested by the test signal. For example, a test signal for a first frequency band may include a first frequency-modulated tone with a base frequency that is within the first frequency band, and a second frequency-modulated tone with a different base frequency that is also within the first frequency band. In another example, a test signal for a first frequency band may include a first frequency-modulated tone with a base frequency that is within the first frequency band using a frequency modulation, and a second frequency-modulated tone with the same base frequency using a different frequency modulation. In some implementations, the frequency-modulation is not symmetric about the base frequency; that is, the base frequency is not necessarily the exact center frequency of the frequency modulation window.

In some implementations, the frequency-modulated tones for a test signal are selected to be at least a predetermined amount away from each other within a frequency band. For example, a test signal for a frequency band may include two frequency-modulated tones with a base frequency difference of at least ten percent of the bandwidth of the frequency band. Alternatively or in addition, the frequency-modulated tones for a test signal are selected to be on opposite sides of the center frequency of the frequency band. For example, a test signal for a frequency band may include a first frequency-modulated tone below the center frequency of the frequency band and a second frequency-modulated tone above the center frequency of the frequency band. In some implementations, the frequency-modulated tones for a test signal are selected to extend a predetermined amount on either side of the center frequency of the frequency band. For example, a test signal for a frequency band may include a first frequency-modulated tone that extends below the center frequency of the frequency band by five percent of the bandwidth of the frequency band and a second frequency-modulated tone that extends above the center frequency of the frequency band by five percent of the bandwidth of the frequency band.

Figure 2A:
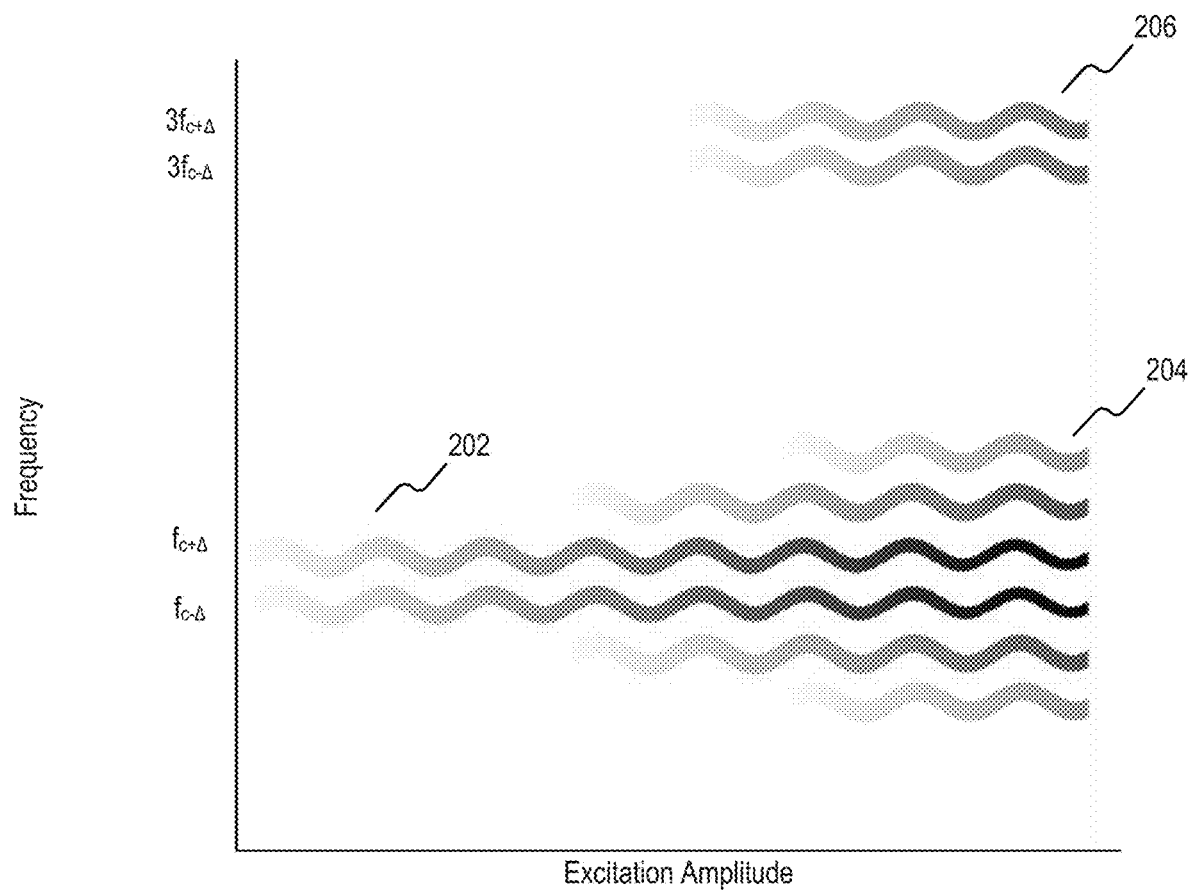
FIG. 2A illustrates a waveform of an exemplary relationship between system behavior and excitation amplitude, according to an implementation of the present disclosure.

Pure tones produce harmonic distortion due to, among other things, nonlinearities in an audio system. Harmonic distortion, however, is inaudible when the fundamental frequency is greater than half the upper frequency threshold of the listener (which varies from listener to listener); for example, above 12 kilohertz. Thus, pure tones are unsuitable for characterizing perceived transducer distortion at fundamental frequencies over a particular limit. While the following description uses 12 kilohertz as the particular limit for explanatory purposes, the present disclosure is not so limited. On the other hand, in addition to producing harmonic distortion, multiple simultaneous frequency-modulated tones also produce intermodulation distortion (IMD). Intermodulation distortion is the amplitude modulation of signals containing two or more different frequencies, caused, for example, by nonlinearities in an audio system. The intermodulation between frequency components forms additional components at frequencies that are not just at harmonic frequencies of either frequency component, and is thus different from the case of harmonic distortion. FIG. 2A illustrates an example of the relationship between the system behavior and excitation amplitude. As illustrated in FIG. 2A, at low excitation amplitudes two tones 202, which may be the tones generated by the signal generator 102, are present. As the excitation amplitude increases, subharmonic intermodulation products 204 may be introduced. Once the excitation amplitude exceeds a particular threshold, harmonic distortion products 206 may become present and noticeable. The particular type of products introduced as the excitation amplitude increases (whether subharmonic intermodulation products 204, harmonic distortion products 206, or both) is system-dependent. In some systems, the harmonic distortion products 206 may be measurable before the subharmonic intermodulation products 204. Generally, intermodulation forms additional components at the sum and difference frequencies of the original frequencies and at sums and differences of multiples of those frequencies. For example, intermodulation between different frequencies above 12 kilohertz can create distortion (i.e., intermodulation distortion) at frequencies below 12 kilohertz. In other words, a test signal including two frequency-modulated tones above 12 kilohertz will generate audible distortion. Thus, the test signals generated by the signal generator 102 allow characterization of perceived transducer distortion at fundamental frequencies above 12 kilohertz.

The signal generator 102 is configured to combine the two or more simultaneous frequency-modulated tones together within an amplitude-modulated envelope. The system 100 may further include linear filter protection, such as a notch filter, disposed in series with (e.g., preceding) the multiband compressor 104. Such protection may ensure that the multiband compressor 104 can operate without limiting or compressing the signal around a resonant peak of a speaker or of the system as a whole. As will be explained below in more detail, the amplitude-modulated envelope helps a listener differentiate between distorted audio signals and non-distorted audio signals by providing an undistorted reference point that is always audible. The amplitude-modulated envelope varies the amplitude of the test signal between a modulation amplitude and a carrier amplitude. The modulation amplitude is the peak change in the level of the test signal from its unmodulated value. The carrier amplitude is the amplitude of the carrier wave used to generate the amplitude-modulated envelope. The modulation amplitude is greater than the carrier amplitude. Thus, the amplitude-modulated envelope causes the amplitude of the test signal to vary (i.e., periodically sweep) between a lower level at the carrier amplitude and a higher level at the modulation amplitude. Perceived distortion of the audio signal occurs when the amplitude of the test signal exceeds a distortion threshold. The amplitude (i.e., volume level) of the audio signal generated by the audio transducer 106 follows the amplitude of the test signal. Thus, the audio transducer 106 generates an undistorted audio signal when the amplitude of the test signal is below the distortion threshold and a distorted audio signal when the amplitude of the test signal is above the distortion threshold. The amplitude-modulated envelope of the test signal causes the audio signal to vary (i.e., periodically sweep) between a lower level below the distortion threshold and a higher level above the distortion threshold. In other words, the amplitude-modulated envelope of the test signal causes the audio transducer 106 to generate non-distorted audio signals that can be used by a listener, such as the operator 110, as an undistorted reference point for comparison against distorted audio signals generated by the audio transducer 106. The modulation may itself be controlled by the operator 110. In some examples, the system 100 may be provided with a slider or other input device to allow the operator 110 to adjust the gain and thereby control the amplitude modulation. Additionally or alternatively, the operator 110 may adjust the rate of the frequency modulation of one or both of the frequency-modulated tones, the range of the frequency modulation, the rate of amplitude modulation, or combinations thereof.

The signal generator 102 is configured to set the difference between the modulation amplitude and the carrier amplitude of the amplitude-modulated envelope to be noticeable for the operator 110 to be able to identify the difference between distorted audio signals and non-distorted audio signals. For most cases, the lowest noticeable difference for a human listener is approximately one decibel. Thus, in some implementations, the difference between the modulation amplitude and the carrier amplitude of the amplitude-modulated envelope is set to be greater than one decibel. From testing with human listeners, a difference of approximately six decibels was identified as providing a clear distinction between distorted audio signals and non-distorted audio signals. Thus, in some implementations, the difference between the modulation amplitude and the carrier amplitude of the amplitude-modulated envelope is set to be approximately six decibels. In some implementations, the window length of the amplitude-modulated envelope is set based on the center frequency of the frequency band. For example, the window length is set to provide a fixed number of cycles based on the center frequency of the frequency band.

Figure 2B:
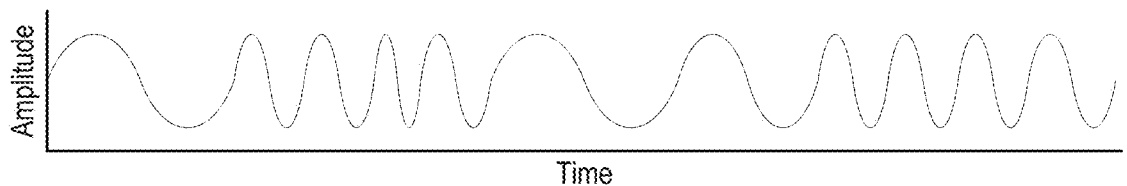
FIG. 2B illustrates a waveform of a first exemplary frequency-modulated tone, according to an implementation of the present disclosure.
Figure 2C:
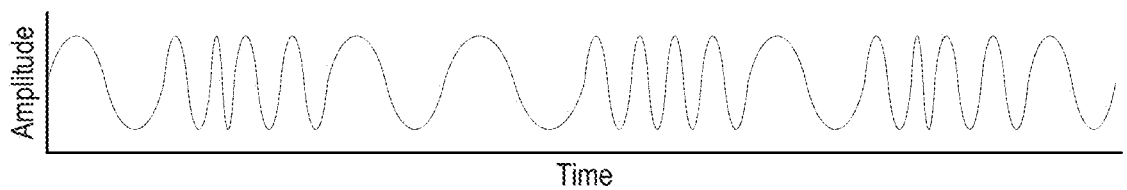
FIG. 2C illustrates a waveform of a second exemplary frequency-modulated tone, according to an implementation of the present disclosure.
Figure 2D:
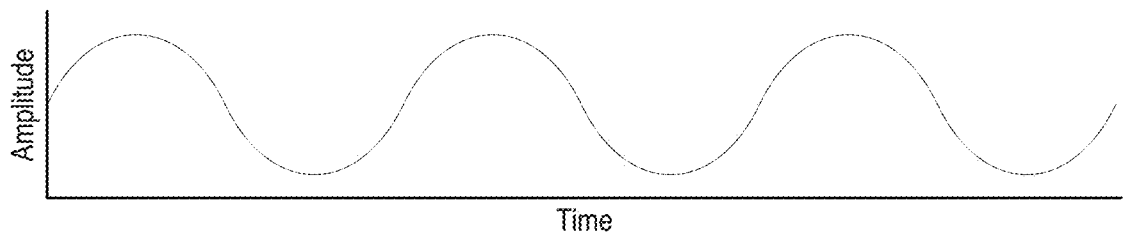
FIG. 2D illustrates a waveform of an exemplary amplitude-modulated envelope, according to an implementation of the present disclosure.
Figure 2E:
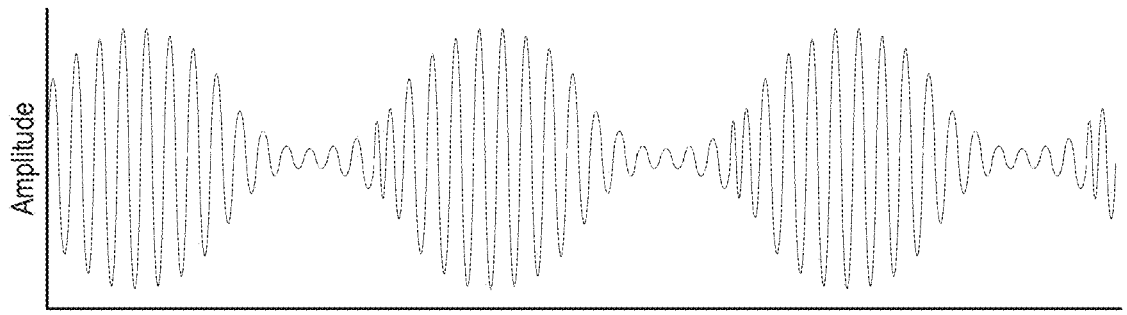
FIG. 2E illustrates a waveform of an exemplary test signal generated by combining the first frequency-modulated tone of FIG. 2B and the second frequency-modulated tone of FIG. 2C within the amplitude-modulated envelope of FIG. 2D, according to an implementation of the present disclosure.
Figure 2F:
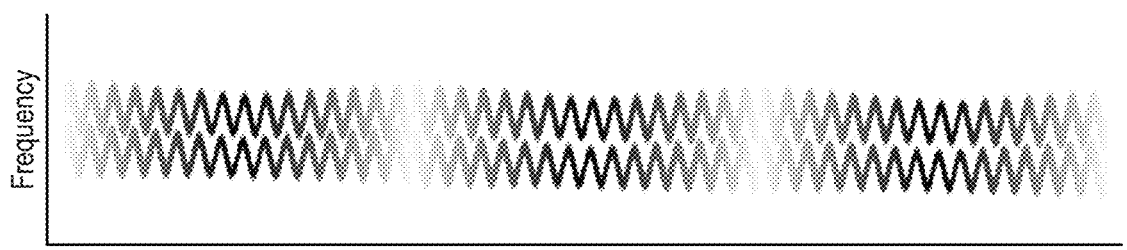
FIG. 2F provides an alternative illustration of the waveform of the exemplary test signal illustrated in FIG. 2E.

FIGS. 2B through 2F illustrate waveforms for an exemplary test signal for a frequency band, according to an implementation of the present disclosure. For ease of explanation, the frequency band for this example is the thirteenth critical band of the Bark scale described above, which has a center frequency of 1,850 hertz, a cut-off frequency of 2,000 hertz, and a bandwidth of 280 hertz. FIG. 2B illustrates a waveform of a first exemplary frequency-modulated tone of 1,800 hertz. FIG. 2C illustrates a waveform of a second exemplary frequency-modulated tone of 1,950 hertz. FIG. 2D illustrates a waveform of an exemplary amplitude-modulated envelope. FIG. 2E illustrates a waveform of an exemplary test signal generated by combining the first frequency-modulated tone of FIG. 2B and the second frequency-modulated tone of FIG. 2C within the amplitude-modulated envelope of FIG. 2D. FIG. 2F illustrates a frequency-domain behavior of the waveforms described above. Returning to FIG. 1, the multi-band compressor 104 is coupled to the signal generator 102 and is configured to receive the test signal therefrom. The multi-band compressor 104 is configured to apply differing gain values to each frequency band. As described above, each test signal includes components for one frequency band. Thus, the multi-band compressor 104 is configured to adjust an amplitude of the test signal by applying a gain value corresponding to the frequency band of the components included in the test signal. By applying the gain value, the multi-band compressor 104 effectively limits the peak amplitude of the test signal to a threshold value. As will be described below in more detail, the gain values of the multi-band compressor 104 are user-selectable via user input.

The audio transducer 106 (for example, a loudspeaker) is coupled to the multi-band compressor 104 and receives the test signal therefrom. The audio transducer 106 is configured to generate an audio signal based on the test signal. In some implementations, the audio signal is within the audible frequency range for humans. In general, the audible frequency range for humans is from 20 hertz to 20,000 hertz.

The controller 108 is configured to receive user input indicating a gain value. In some implementations, the user input indicates a position of a physical or virtual slider that corresponds to specific gain value. For example, a user (such as the operator 110) increases the gain value by moving the slider in one direction and decreasing the gain value by moving the slider in the opposite direction. As described above, the gain values of the multi-band compressor 104 are user-selectable via user input. Thus, if a gain value indicated by a user input differs from the current gain value applied by the multi-band compressor 104, the gain value of the multi-band compressor 104 is adjusted to match the gain value indicated by the user input. For example, if a gain value of the multi-band compressor 104 is five decibels and the controller 108 receives a user input indicating a gain value of three decibels, the gain value of the multi-band compressor 104 is adjusted from five decibels to three decibels. In some implementations, the user input indicates a gain value for a specific frequency band of the multi-band compressor 104.

The above-described tuning may be performed an end-user of the audio device (e.g., a home consumer). In such cases, the end-user may overdrive the band based on, for example, a user metric; therefore, a range of thresholds may be provided and programmed into the multi-band compressor 104. Such provision and/or programming may be performed at a time of initial calibration or manufacture of the audio device; that is, before the audio device is obtained by the end-user.

While the audio transducer 106 is generating the audio signal, the operator 110 listening to the audio signal may hear distortions when the amplitude (i.e., volume level) of the audio signal exceeds a distortion threshold. The operator 110 may indicate the presence of distortion in the audio signal by providing user input to the controller 108 that adjusts (for example, lowers) the gain value of the multi-band compressor 104 until the user cannot hear distortion in the audio signal. The user-selected gain value represents one form of manual characterization of perceived transducer distortion in accordance with the present disclosure. Further, as described above, the gain value applied by the multi-band compressor 104 effectively limits the peak amplitude of the test signal to a threshold value. Thus, the user-selected gain value for a frequency band defines a distortion threshold for that frequency band. This distortion threshold for a frequency band that is defined by a user-selected gain value for that frequency band is another form of manual characterization of perceived transducer distortion in accordance with the present disclosure.

In some implementations, the controller 108 is further configured to determine a distortion threshold for the frequency band based on the gain value for the frequency band. For example, the controller 108 may use a stored look-up table that includes distortion threshold values for each gain value of the multi-band compressor 104.

Figure 3:
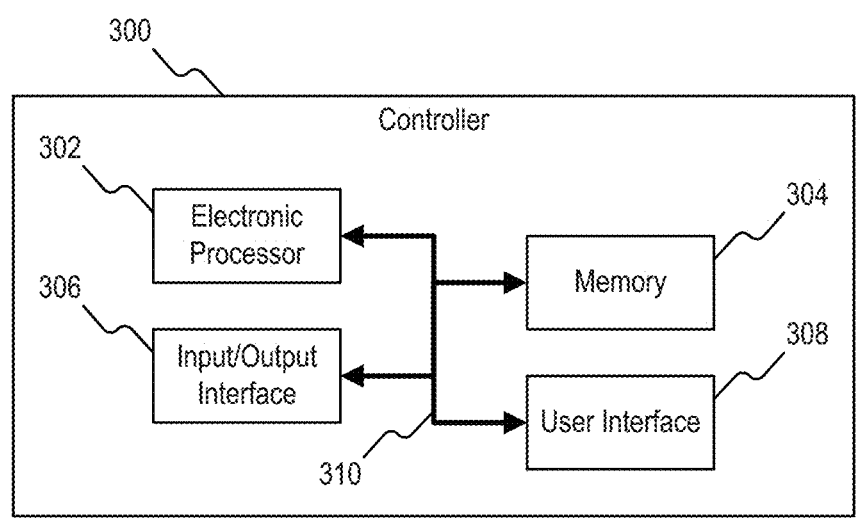
FIG. 3 illustrates a block diagram of an exemplary controller, according to an implementation of the present disclosure.

FIG. 3 is a block diagram of example components of a controller 300 according to an implementation of the present disclosure, which may be, for example, the controller 108 illustrated in FIG. 1. In the implementation illustrated in FIG. 3, the controller 300 includes an electronic processor 302 (for example, one or more microprocessors, ASICs, SoCs, or other electronic controllers), memory 304, an input/output interface 306, a user interface 308, and a bus 310. In practice, the controller 300 may include additional components such as communication circuitry, sensors, a power supply, and the like. For ease of explanation, these additional components are not illustrated here.

The bus 310 connects various components of the controller 300 including, for example, the memory 304 to the electronic processor 302. The memory 304, for example, includes read only memory (ROM), random access memory (RAM), an electrically erasable programmable read-only memory (EEPROM), other non-transitory computer-readable media, or a combination thereof. The electronic processor 302 is configured to retrieve program instructions and data from the memory 304 and execute, among other things, instructions to perform the methods described herein. In some implementations, the memory 304 is included in the electronic processor 302.

The input/output interface 306 includes routines for transferring information between components within the controller 300 and other components of the system 100, as well as components external to the system 100. The input/output interface 306 is configured to transmit and receive signals via wires, fiber, wirelessly, or a combination thereof. Signals may include, for example, gain values, distortion thresholds, information, data, serial data, data packets, analog signals, or a combination thereof.

The user interface 308 includes, for example, a computer having a display and input devices, a touch-screen display, a plurality of knobs, dials, switches, buttons, faders, and the like. In some implementations, the user interface 308 includes a touch-sensitive interface (for example, a touch-screen display) that displays visual output generated by software applications executed by the electronic processor 302. Visual output includes, for example, graphical indicators, lights, colors, text, images, graphical user interfaces (GUIs), combinations of the foregoing, and the like. The touch-sensitive interface also receives user input using detected physical contact (for example, detected capacitance or resistance). In some implementations, the user interface 308 is separated from the controller 300 or from the system 100.

Figure 4:
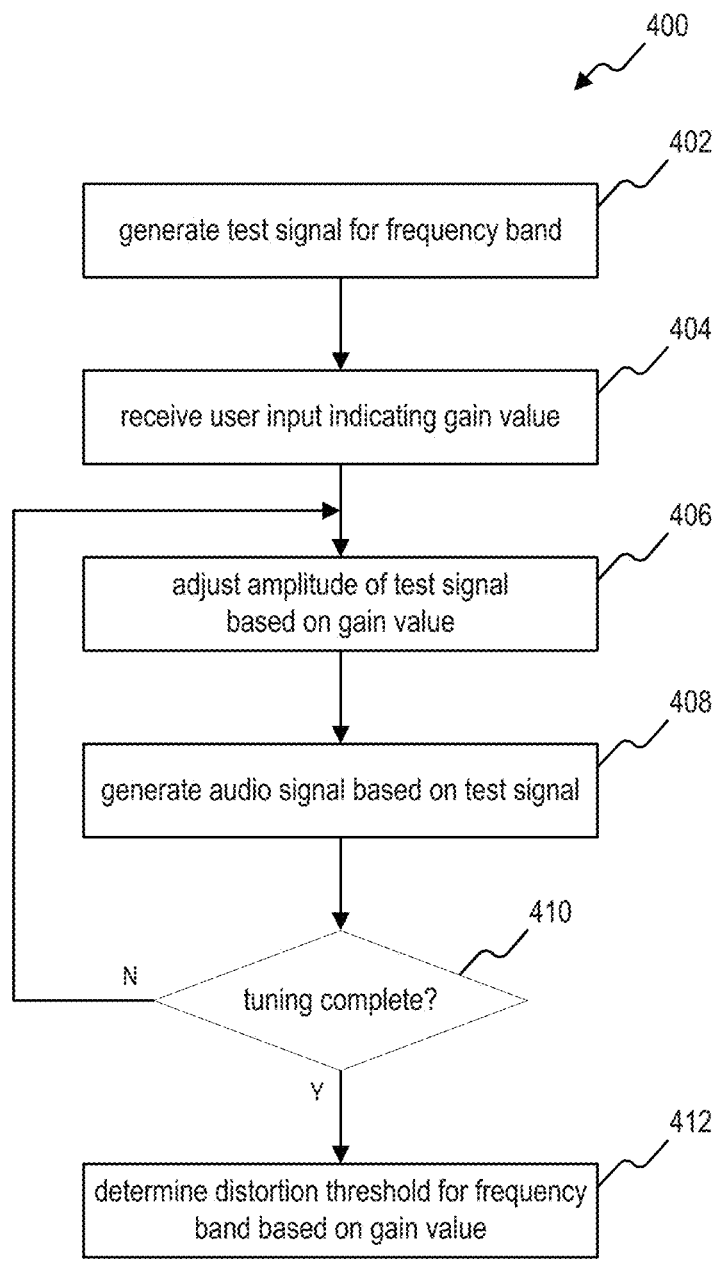
FIG. 4 illustrates a flow diagram of an exemplary method for manual characterization of perceived transducer distortion, according to an implementation of the present disclosure.

FIG. 4 illustrates a flow diagram of an example method 400 for manual characterization of perceived transducer distortion according to an implementation of the present disclosure. For ease of description, the method 400 is described below as being performed by the system 100 illustrated in FIG. 1. At block 402, a test signal for a frequency band is generated (for example, by the signal generator 102). The test signal includes at least two simultaneous frequency-modulated tones combined together in an amplitude-modulated envelope. The at least two simultaneous frequency-modulated tones have different frequencies within the frequency band. In some implementations, the frequency band of the test signal is a frequency band of the multi-band compressor 104. At block 404, a user input indicating a gain value is received (for example, by the controller 108). At block 406, an amplitude of the test signal is adjusted based on the gain value. For example, the multi-band compressor 104 adjusts the amplitude of the test signal by applying the gain value indicated by the user input. At block 408, the audio transducer 106 generates an audio signal based on the test signal. In some implementations, at block 412, a distortion threshold is determined for the frequency band based on the gain value. For example, the controller 108 may use a stored look-up table that includes distortion threshold values for each gain value of the multi-band compressor 104.

In some implementations, after generating the audio signal at block 408, the method 400 returns to block 404 to receive a new (or updated) user input indicating a new (or updated) gain value. In such implementations, at block 410 the user determines whether tuning is satisfactorily complete and, if tuning is not complete, further adjusts the amplitude of the test signal at block 404. In some implementations, blocks 404 through 408 are repeated serially until the user cannot hear distortion in the audio signal. In some implementations, the method 400 is repeated for each frequency band of the multi-band compressor 104 to determine gain values (and distortion thresholds) for each frequency band of the multi-band compressor 104.

Implementation Mechanisms—Hardware Overview

According to one implementation, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. The techniques are not limited to any specific combination of hardware circuitry and software, nor to any particular source for the instructions executed by a computing device or data processing system.

The term "storage media" as used herein refers to any media that store data and/or instructions that cause a machine to operation in a specific fashion. It is non-transitory. Such storage media may comprise non-volatile media and/or volatile media. Non-volatile media includes, for example, optical or magnetic disks. Volatile media includes dynamic memory. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics. Transmission media can also take the form of acoustic or light waves, such as those generated during radio-wave and infra-red data communications.

The term "audio transducer" as used herein can include, without limitation, a loudspeaker (for example, a direct radiating electro-dynamic driver mounted in an enclosure), a horn loudspeaker, a piezoelectric speaker, a magnetostrictive speaker, an electrostatic loudspeaker, ribbon and planar magnetic loudspeaker, a bending wave loudspeaker, a flat panel loudspeaker, a distributed mode loudspeaker, a Heil air motion transducer, a plasma arc speaker, a digital speaker, and any combination/mix thereof.

Equivalents, Extensions, Alternatives, and Miscellaneous

In the foregoing specification, possible implementations of the present disclosure have been described with reference to numerous specific details that may vary from implementation to implementation. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense. It should be further understood, for clarity, that exempli gratia (e.g.) means "for the sake of example" (not exhaustive), which differs from id est (i.e.) or "that is."

Additionally, in the foregoing description, numerous specific details are set forth such as examples of specific components, devices, methods, etc., in order to provide a thorough understanding of implementations of the present disclosure. It will be apparent, however, to one skilled in the art that these specific details need not be employed to practice implementations of the present disclosure. In other instances, well-known materials or methods have not been described in detail in order to avoid unnecessarily obscuring implementations of the present disclosure.

Various aspects of the present disclosure may take any one or more of the following exemplary configurations:

EEE(1) A system, comprising: a signal generator configured to generate a test signal for a frequency band, the test signal including at least two simultaneous frequency-modulated tones, the at least two simultaneous frequency-modulated tones having different frequencies within the frequency band; a controller configured to receive user input indicating a gain value; a multi-band compressor coupled to the signal generator and configured to adjust an amplitude of a component of the test signal based on the gain value; and an audio transducer coupled to the multi-band compressor and configured to generate an audio signal based on the test signal.

EEE(2) The system according to EEE(1), wherein the controller is further configured to determine a distortion threshold for the frequency band based on the gain value.

EEE(3) The system according to EEE(1) or EEE(2), wherein the test signal includes an amplitude-modulated envelope including at least one of the at least two simultaneous frequency-modulated tones.

EEE(4) The system according to EEE(3), wherein the signal generator is further configured to generate the test signal including the amplitude-modulated envelope having a difference of at least one decibel between a modulation amplitude of the amplitude-modulated envelope and a carrier amplitude of the amplitude-modulated envelope.

EEE(5) The system according to EEE(3) or EEE(4), wherein the signal generator is further configured to generate the test signal including the amplitude-modulated envelope having a difference of approximately six decibels between a modulation amplitude of the amplitude-modulated envelope and a carrier amplitude of the amplitude-modulated envelope.

EEE(6) The system according to any one of EEE(3) to EEE(5), wherein the signal generator is further configured to set a window length of the amplitude-modulated envelope based on a center frequency of the frequency band.

EEE(7) The system according to any one of EEE(1) to EEE(6), wherein the different frequencies of the at least two simultaneous frequency-modulated tones are all greater than a predetermined threshold.

EEE(8) A method, comprising: generating a test signal for a frequency band, the test signal including at least two simultaneous frequency-modulated tones, the at least two simultaneous frequency-modulated tones having different frequencies within the frequency band; receiving user input indicating a gain value; adjusting an amplitude of a component of the test signal based on the gain value; and generating an audio signal with an audio transducer based on the test signal.

EEE(9) The method according to EEE(8), further comprising determining a distortion threshold for the frequency band based on the gain value.

EEE(10) The method according to EEE(8) or EEE(9), wherein generating the test signal includes generating an amplitude-modulated envelope including at least one of the at least two simultaneous frequency-modulated tones.

EEE(11) The method according to EEE(10), wherein a difference between a modulation amplitude of the amplitude-modulated envelope and a carrier amplitude of the amplitude-modulated envelope is at least one decibel.

EEE(12) The method according to EEE(10) or EEE(11), wherein a difference between a modulation amplitude of the amplitude-modulated envelope and a carrier amplitude of the amplitude-modulated envelope is approximately six decibels.

EEE(13) The method according to any one of EEE(10) to EEE(12), further comprising determining a window length for the amplitude-modulated envelope based on a center frequency of the frequency band.

EEE(14) The method according to any one of EEE(8) to EEE(13), wherein the different frequencies of the at least two simultaneous frequency-modulated tones are all greater than a predetermined threshold.

EEE(15) A non-transitory computer-readable medium storing instructions that, when executed by an electronic processor of a computer, cause the computer to perform operations comprising: generating a test signal for a frequency band, the test signal including at least two simultaneous frequency-modulated tones, the at least two simultaneous frequency-modulated tones having different frequencies within the frequency band; receiving a user input indicating a gain value; adjusting an amplitude of a component of the test signal based on the gain value; and generating an audio signal with an audio transducer based on the test signal.

EEE(16) The non-transitory computer-readable medium according to EEE(15), further comprising determining a distortion threshold for the frequency band based on the gain value.

EEE(17) The non-transitory computer-readable medium according to EEE(15) or EEE(16), wherein generating the test signal includes generating an amplitude-modulated envelope including at least one of the at least two simultaneous frequency-modulated tones.

EEE(18) The non-transitory computer-readable medium according to EEE(17), wherein a difference between a modulation amplitude of the amplitude-modulated envelope and a carrier amplitude of the amplitude-modulated envelope is at least one decibel.

EEE(19) The non-transitory computer-readable medium according to EEE(17) or EEE(18), wherein a difference between a modulation amplitude of the amplitude-modulated envelope and a carrier amplitude of the amplitude-modulated envelope is approximately six decibels.

EEE(20) The non-transitory computer-readable medium according to any one of EEE(17) to EEE(19), further comprising determining a window length for the amplitude-modulated envelope based on a center frequency of the frequency band.

What is claimed is:

1. A system, comprising:
    a signal generator configured to generate a test signal for a frequency band, the test signal including at least two simultaneous frequency-modulated tones, the at least two simultaneous frequency-modulated tones having different frequencies within the frequency band;
    a controller configured to receive user input indicating a gain value;
    a multi-band compressor coupled to the signal generator and configured to split the test signal into a plurality of frequency sub-bands, and to individually adjust an amplitude of a component of each of the plurality of frequency sub-bands based on the gain value; and
    an audio transducer coupled to the multi-band compressor and configured to generate an audio signal based on the test signal.

2. The system according to claim 1, wherein the controller is further configured to determine a distortion threshold for the frequency band based on the gain value.

3. The system according to claim 1, wherein the test signal includes an amplitude-modulated envelope including at least one of the at least two simultaneous frequency-modulated tones.

4. The system according to claim 3, wherein the signal generator is further configured to generate the test signal including the amplitude-modulated envelope having a difference of at least one decibel between a modulation amplitude of the amplitude-modulated envelope and a carrier amplitude of the amplitude-modulated envelope.

5. The system according to claim 3, wherein the signal generator is further configured to generate the test signal including the amplitude-modulated envelope having a difference of approximately six decibels between a modulation amplitude of the amplitude-modulated envelope and a carrier amplitude of the amplitude-modulated envelope.

6. The system according to claim 3, wherein the signal generator is further configured to set a window length of the amplitude-modulated envelope based on a center frequency of the frequency band.

7. The system according to claim 1, wherein the different frequencies of the at least two simultaneous frequency-modulated tones are all greater than a predetermined threshold.

8. A method, comprising:
    generating a test signal for a frequency band, the test signal including at least two simultaneous frequency-modulated tones, the at least two simultaneous frequency-modulated tones having different frequencies within the frequency band;
    receiving user input indicating a gain value;
    splitting the test signal into a plurality of frequency sub-bands;
    individually adjusting an amplitude of a component of each of the plurality of frequency sub-bands based on the gain value; and
    generating an audio signal with an audio transducer based on the test signal.

9. The method according to claim 8, further comprising determining a distortion threshold for the frequency band based on the gain value.

10. The method according to claim 8, wherein generating the test signal includes generating an amplitude-modulated envelope including at least one of the at least two simultaneous frequency-modulated tones.

11. The method according to claim 10, wherein a difference between a modulation amplitude of the amplitude-modulated envelope and a carrier amplitude of the amplitude-modulated envelope is at least one decibel.

12. The method according to claim 10, wherein a difference between a modulation amplitude of the amplitude-modulated envelope and a carrier amplitude of the amplitude-modulated envelope is approximately six decibels.

13. The method according to claim 10, further comprising determining a window length for the amplitude-modulated envelope based on a center frequency of the frequency band.

14. The method according to claim 8, wherein the different frequencies of the at least two simultaneous frequency-modulated tones are all greater than a predetermined threshold.

15. A non-transitory computer-readable medium storing instructions that, when executed by an electronic processor of a computer, cause the computer to perform operations comprising:
    generating a test signal for a frequency band, the test signal including at least two simultaneous frequency-modulated tones, the at least two simultaneous frequency-modulated tones having different frequencies within the frequency band;

receiving a user input indicating a gain value;

splitting the test signal into a plurality of frequency sub-bands;

individually adjusting an amplitude of a component of each of the plurality of frequency sub-bands based on the gain value; and generating an audio signal with an audio transducer based on the test signal.

16. The non-transitory computer-readable medium according to claim 15, further comprising determining a distortion threshold for the frequency band based on the gain value.

17. The non-transitory computer-readable medium according to claim 15, wherein generating the test signal includes generating an amplitude-modulated envelope including at least one of the at least two simultaneous frequency-modulated tones.

18. The non-transitory computer-readable medium according to claim 17, wherein a difference between a modulation amplitude of the amplitude-modulated envelope and a carrier amplitude of the amplitude-modulated envelope is at least one decibel.

19. The non-transitory computer-readable medium according to claim 17, wherein a difference between a modulation amplitude of the amplitude-modulated envelope and a carrier amplitude of the amplitude-modulated envelope is approximately six decibels.

20. The non-transitory computer-readable medium according to claim 17, further comprising determining a window length for the amplitude-modulated envelope based on a center frequency of the frequency band.

* * * * *